United States Patent Office 3,253,408
Patented May 31, 1966

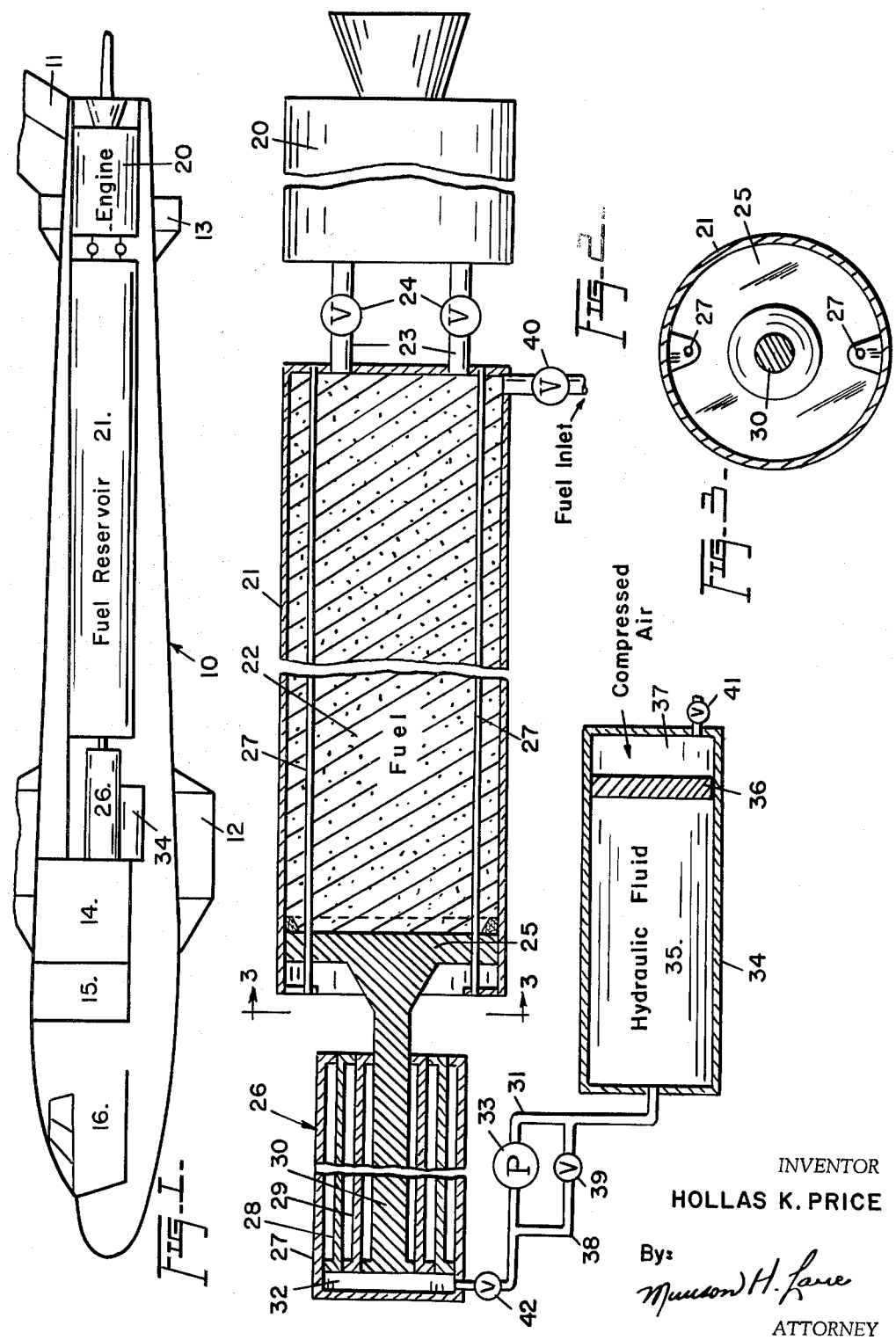

3,253,408
ROCKET ENGINE FUEL FEEDING SYSTEM
Hollas K. Price, P.O. Box 701, Oak Hill, W. Va.
Filed Sept. 23, 1963, Ser. No. 310,724
1 Claim. (Cl. 60—39.48)

This invention relates to new and useful improvements in space craft adapted for orbital and/or interplanetary flights, and in particular the invention concerns itself with certain improvements in space craft disclosed in my co-pending patent application Serial No. 209,816 filed July 12, 1962 and application Serial No. 249,393 filed January 4, 1963.

My aforementioned earlier applications disclose a space craft having a fuselage which contains a row of individually and successively usable rocket engines, capable of boosting the craft into orbit or along a selected trajectory, changing the orbit or trajectory on successive occasions as desired, and ultimately returning the craft for re-entry into the earth's atmosphere. The engines are expendable and are individually and successively jettisoned from the craft after burn-out. Since the maneuverability of the craft, that is, changes of orbit or trajectory, is limited by the number of engines carried in the fuselage, which in turn is dictated by the size of the craft, and since on occasions a desired orbital or trajectory change does not require the full power of a single engine to be expended, the multiple rocket engine arrangement of the aforementioned applications does not afford the optimum efficiency in utilization of available power. Moreover, the multiplicity of burnt out engines jettisoned during the flight is an undesirable factor which eventually might result in undue cluttering of space.

It is, therefore, the principal object of the present invention to eliminate the disadvantages above outlined, this being attained by providing the space craft with only a single rocket engine as a permanent component thereof, together with a reservoir for monopropellant type rocket fuel and means for delivering a selected amount of fuel from the reservoir to the engine at a time to provide thrust for a duration sufficient for one particular boost. This procedure may be repeated as often as desired and as long as a supply of fuel remains in the reservoir, so that efficient utilization of fuel is realized and cluttering of space by jettisoned hardware does not occur.

Other objects, features and advantages of the present invention will be apparent from the following description taken in conjunction with the accompanying drawings, wherein like characters of reference are used to designate like parts, and wherein:

FIGURE 1 is a longitudinal sectional view of the improved space craft, partly broken away and with some components shown in elevation;

FIGURE 2 is a fragmentary view, partly in section and partly in elevation, of the rocket engine, fuel reservoir and hydraulic system for feeding fuel from the reservoir to the engine; and FIGURE 3 is a cross-sectional view, taken substantially in the plane of the line 3—3 in FIGURE 2.

Referring now to the accompanying drawings in detail, the reference numeral 10 designates the fuselage of the space craft of the invention, the same corresponding substantially to that disclosed in my aforementioned application Serial No. 249,393. Except for the rocket engine arrangement hereinafter detailed, the fuselage 10 is equipped with a wing (not shown), tail empennage 11, jet engines (also not shown) on the wing, a nacelle 12 for additional jet engines around the fuselage, a steering jet unit 13 near the tail empennage 11, a jet fuel tank 14, a compressed air or hydrogen peroxide tank 15 for the steering jet unit, and a cockpit 16, all arranged in much the same manner as in application Serial No. 249,393, so that a detailed description thereof at this point is unnecessary.

However, in place of the multiplicity of rocket engines provided in my aforementioned applications, the fuselage 10 herein contains only one, permanent rocket engine 20 which is mounted in the tail portion of the fuselage and exhausts through the open tail end thereof. Disposed forwardly of the engine 20 in the fuselage is an elongated tank or reservoir 21 containing rocket fuel such as monopropellant 22 in semi-solid or gelatinous form. Selected amounts of this fuel may be delivered into the engine 20 through conduits 23 which extend from the reservoir 21 to the engine and are equipped with shut-off valves 24. The fuel is delivered from the reservoir into the engine under pressure of a piston 25 which is slidable in the reservoir by a hydraulic cylinder unit 26, the piston 25 being slidably guided by both the lateral wall of the reservoir and a pair of guide rods 27 which extend longitudinally in the reservoir, as is best shown in FIGURE 3.

The hydraulic cylinder unit 26 is coaxial with the reservoir 21 and includes an outer cylinder member 27, a plurality of intermediate members 28, 29, and an inner member 30 which in effect constitutes a piston rod for the piston 25 in the reservoir. The members 28, 29, 30 are slidably telescoped in the outer member 27 and when hydraulic fluid under pressure is admitted through a conduit 31 into the end portion 32 of the cylinder unit 26, the telescoped members 28, 29, 30 will be slid outwardly from the member 27, thus causing the piston 25 to travel rearwardly in the reservoir 21. The cylinder unit 26 is extended by increments to cause the piston 25 to force predetermined amounts of fuel into the engine 20. In other words, a charge of fuel is forced from the reservoir into the engine, the valves 24 are closed, and the engine is fired to provide the desired boost. After burn-out, the valves 24 may be opened and another charge of fuel forced into the engine from the reservoir for subsequent firing, and this procedure may be repeated as often as desired, and with varying amounts of fuel if desired, as long as a supply of fuel remains in the reservoir.

Hydraulic fluid is delivered to the cylinder unit 26 through the conduit 31 by a suitable pump 33, the conduit communicating with a storage tank 34 wherein the hydraulic fluid is contained in a chamber 35 at one side of a slidable partition 36. On the other side of the partition 36 is a chamber 37 containing highly compressed air which, by exerting pressure on the slidable partition 36, pressurizes the hydraulic fluid in the compartment 35 to assure its proper feeding to the pump 33 even in the absence of gravity in space.

The conduit 31 is equipped with a by-pass 38 around the pump 33, the by-pass having a valve 39, so that when this valve is opened, the cylinder unit 26 may be slid back to its retracted or telescoped position and hydraulic fluid returned to the compartment 35 of the tank 34 without passing through the pump 33. It will be also noted that the end of the reservoir 21 adjacent the unit 26 is open, so that as the members 28, 29, 30 of the unit 26 are extended, they may enter the inside of the reservoir while the piston 25 travels rearwardly therein. The rear end portion of the reservoir is provided with an inlet valve 40, through which the reservoir may be charged with fuel. A similar valve 41 is provided on the tank 34 for charging the compartment 37 with compressed air.

In operation, before each flight the reservoir 21 is charged with rocket fuel through the valve 40, which causes the piston 25 to slide toward the cylinder unit 26, thus retracting the latter to its telescoped position and forcing hydraulic fluid into the tank compartment 35 through the by-pass 38 on the conduit 31. During this procedure, the by-pass valve 39 is of course open, as is the tank valve 41 so that as the hydraulic fluid incoming into the compartment 35 slides the tank partition 36 to the right (as viewed in FIG. 2), the compartment 37 is vented to the atmosphere. The valve 39 is then closed and the compartment 37 is pressurized through the valve 41 with highly compressed air, thus correspondingly pressurizing the hydraulic fluid in the compartment 35. When a charge of fuel is to be admitted into the engine 20, the valves 24 are opened and the pump 33 energized so as to deliver hydraulic fluid from the compartment 35 to the cylinder unit 26 and force fuel from the reservoir 21 to the engine by the piston 25, as already mentioned. The pump 33 is preferably a positive displacement pump which does not permit fluid to flow through the conduit 31 to the cylinder unit 26 unless the pump is in operation, but if desired or necessary, a shut-off valve 42 may be provided in the conduit 31, as will be readily apparent.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

In a rocket engine fuel feeding system, the combination of a fuel storage tank adapted to be charged with a semi-solid monopropellant, a fuel outlet provided on said tank and communicating with a rocket engine, a piston slidable in said storage tank for discharging fuel through said outlet, a hydraulic cylinder comprising a plurality of concentrically arranged and slidably telescoped sections, the innermost of said sections constituting a slidable actuating member connected directly to said piston for sliding the latter in said storage tank, a hydraulic fluid tank, a slidable partition provided in said hydraulic fluid tank and separating the same into a hydraulic fluid compartment and a gas compartment, a conduit extending from said hydraulic fluid compartment to said hydraulic cylinder, a positive displacement pump provided in said conduit, means for charging the gas compartment of said hydraulic fluid tank with gas under pressure whereby to pressurize fluid in said hydraulic fluid compartment and deliver such fluid to said pump, a by-pass in said conduit for returning fluid from said hydraulic cylinder to said hydraulic fluid compartment around said pump, a shut-off valve provided in said by-pass, and a valved inlet provided on said fuel storage tank for recharging the same with fuel after fuel has been discharged therefrom by said piston.

References Cited by the Examiner

UNITED STATES PATENTS

| | | | |
|---|---|---|---|
| 1,814,874 | 7/1931 | Weber | 60—52 |
| 2,497,300 | 2/1950 | Elliot | 103—44 X |
| 2,671,312 | 3/1954 | Roy | 60—39.48 X |
| 2,779,158 | 1/1957 | Dungan | 60—35.6 |
| 2,915,016 | 12/1959 | Weaver et al. | 103—44 |
| 2,945,344 | 7/1960 | Hutchinson | 60—35.6 |
| 2,971,097 | 2/1961 | Corbett | 60—39.48 X |
| 2,972,225 | 2/1961 | Cumming et al. | 60—39.48 X |
| 3,017,745 | 1/1962 | Shirley et al. | 60—35.6 |
| 3,028,727 | 4/1962 | Anston | 103—44 X |
| 3,070,565 | 12/1962 | McKinnon | 60—39.47 X |
| 3,084,504 | 4/1963 | McKinnon | 60—35.6 |
| 3,092,968 | 6/1963 | Scurlock et al. | 60—35.6 |
| 3,101,058 | 8/1963 | Carr et al. | 103—44 X |

FOREIGN PATENTS 969,930   5/1950   France.

MARK NEWMAN, *Primary Examiner.*

CARLTON R. CROYLE, SAMUEL LEVINE,
*Examiners.*